United States Patent
Jimenez, Jr. et al.

(10) Patent No.: US 10,062,135 B2
(45) Date of Patent: Aug. 28, 2018

(54) GRAPHICS PROCESSING UNIT MANAGEMENT SYSTEM FOR COMPUTED TOMOGRAPHY

(71) Applicant: National Technology & Engineering Solutions of Sandia, LLC, Albuquerque, NM (US)

(72) Inventors: Edward Steven Jimenez, Jr., Albuquerque, NM (US); Laurel Jeffers Orr, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 487 days.

(21) Appl. No.: 14/447,380

(22) Filed: Jul. 30, 2014

(65) Prior Publication Data

US 2015/0035843 A1    Feb. 5, 2015

Related U.S. Application Data

(60) Provisional application No. 61/860,731, filed on Jul. 31, 2013.

(51) Int. Cl.
   *G06T 1/20*    (2006.01)

(52) U.S. Cl.
   CPC ..................... *G06T 1/20* (2013.01)

(58) Field of Classification Search
   None
   See application file for complete search history.

(56) References Cited

U.S. PATENT DOCUMENTS

| | | | | |
|---|---|---|---|---|
| 5,412,766 A * | 5/1995 | Pietras | ..................... | G09G 5/02 345/602 |
| 6,002,872 A * | 12/1999 | Alexander, III | ..... | G06F 11/3466 702/179 |
| 6,070,168 A * | 5/2000 | Jacuzio | ................. | G06F 9/4428 |
| 6,366,970 B1 * | 4/2002 | Wolff | ................. | H04N 21/4435 375/E7.026 |
| 7,185,061 B1 * | 2/2007 | Gopal | ..................... | H04L 43/00 709/207 |
| 7,861,060 B1 * | 12/2010 | Nickolls | ................. | G06F 9/522 712/22 |
| 8,234,478 B1 * | 7/2012 | Roberts | ............... | G06F 12/0895 711/167 |
| RE44,129 E * | 4/2013 | Apisdorf | ............... | G06F 9/3851 712/216 |
| 8,611,626 B2 | 12/2013 | Miao et al. | | |
| 8,860,741 B1 * | 10/2014 | Juffa | ........................ | G09G 5/36 345/530 |
| 2003/0225468 A1 * | 12/2003 | Abe | .................... | G06F 15/8053 700/94 |

(Continued)

*Primary Examiner* — Jason Pringle-Parker
(74) *Attorney, Agent, or Firm* — Medley, Behrens & Lewis, LLC

(57) ABSTRACT

A method and apparatus for managing operation of graphics processing units in a computer system. A processing thread in the computer system controls processing of a set of sinogram data by a graphics processing unit to form a set of graphics data. An output thread in the computer system controls writing of the set of graphics data to a storage system. The graphics processing unit is available to perform processing of another set of sinogram data while the set of graphics data is written to the storage system such that the increased availability of a plurality of graphics processing units is present.

13 Claims, 15 Drawing Sheets

(56) References Cited

U.S. PATENT DOCUMENTS

| | | | | |
|---|---|---|---|---|
| 2004/0139441 A1* | 7/2004 | Kaburaki | G06F 9/3012 | 718/107 |
| 2005/0138328 A1* | 6/2005 | Moy | G06F 9/3851 | 712/205 |
| 2006/0095901 A1* | 5/2006 | Brokenshire | G06F 9/322 | 717/151 |
| 2007/0014486 A1* | 1/2007 | Schiwietz | G01R 33/4824 | 382/276 |
| 2007/0050603 A1* | 3/2007 | Vorbach | G06F 9/30181 | 712/221 |
| 2007/0139426 A1* | 6/2007 | Greco | G06F 13/1694 | 345/531 |
| 2007/0201611 A1* | 8/2007 | Pratx | A61B 6/508 | 378/4 |
| 2007/0277177 A1* | 11/2007 | Kawamoto | G06F 9/3851 | 718/103 |
| 2008/0106417 A1* | 5/2008 | Bradley | G06Q 10/087 | 340/572.4 |
| 2008/0276220 A1* | 11/2008 | Munshi | G06F 8/314 | 717/119 |
| 2009/0077483 A9* | 3/2009 | Howard | G06F 9/5072 | 715/771 |
| 2009/0300621 A1* | 12/2009 | Mantor | G06F 9/30087 | 718/100 |
| 2010/0123717 A1* | 5/2010 | Jiao | G06T 15/005 | 345/426 |
| 2010/0235603 A1* | 9/2010 | Ravindranath | G06F 9/5016 | 711/170 |
| 2011/0055511 A1* | 3/2011 | Mantor | G06F 9/5016 | 711/170 |
| 2011/0182491 A1 | 7/2011 | Levin et al. | | |
| 2013/0057562 A1* | 3/2013 | Nordlund | G06F 12/0802 | 345/522 |
| 2013/0343672 A1 | 12/2013 | Yu et al. | | |

* cited by examiner

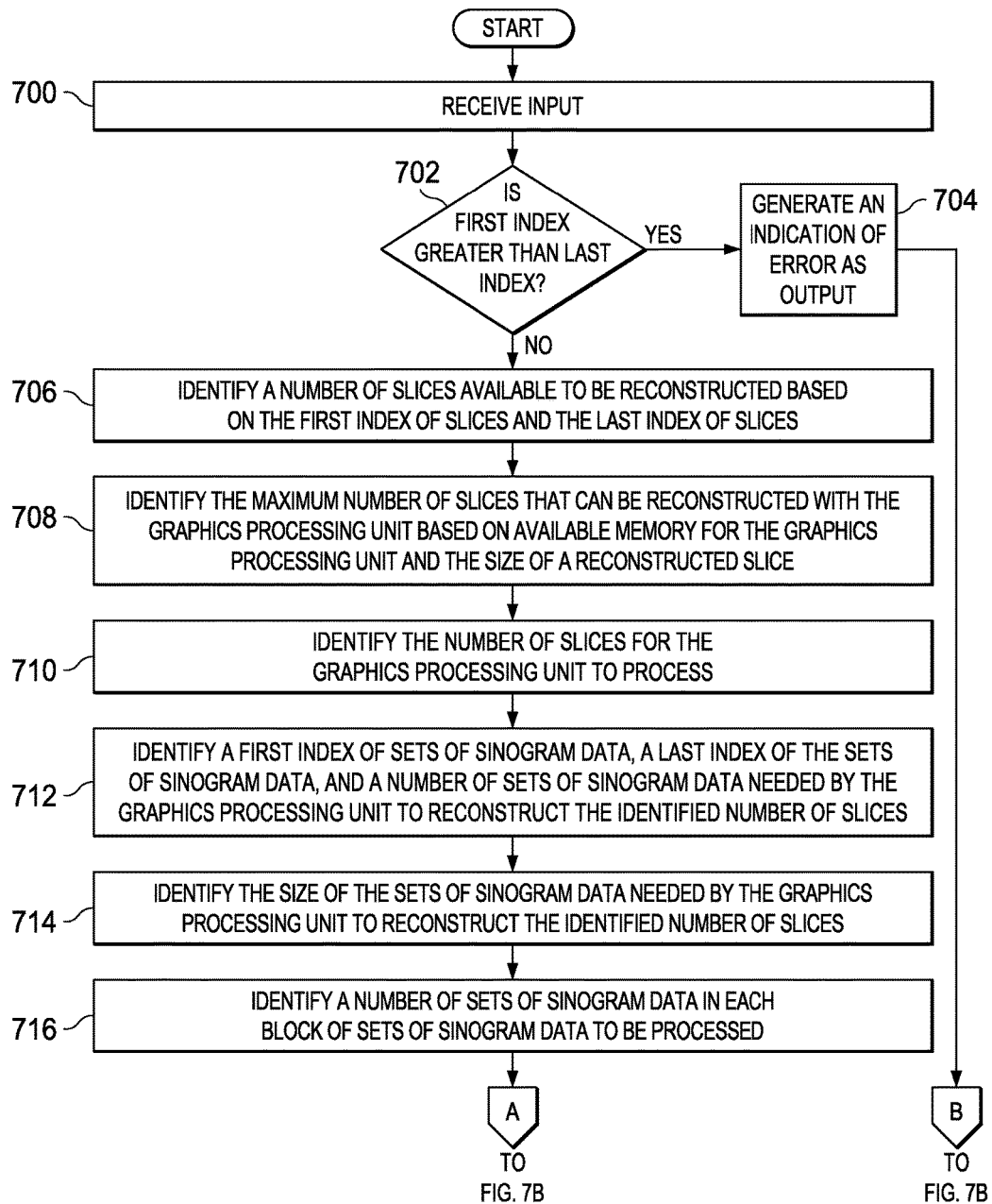

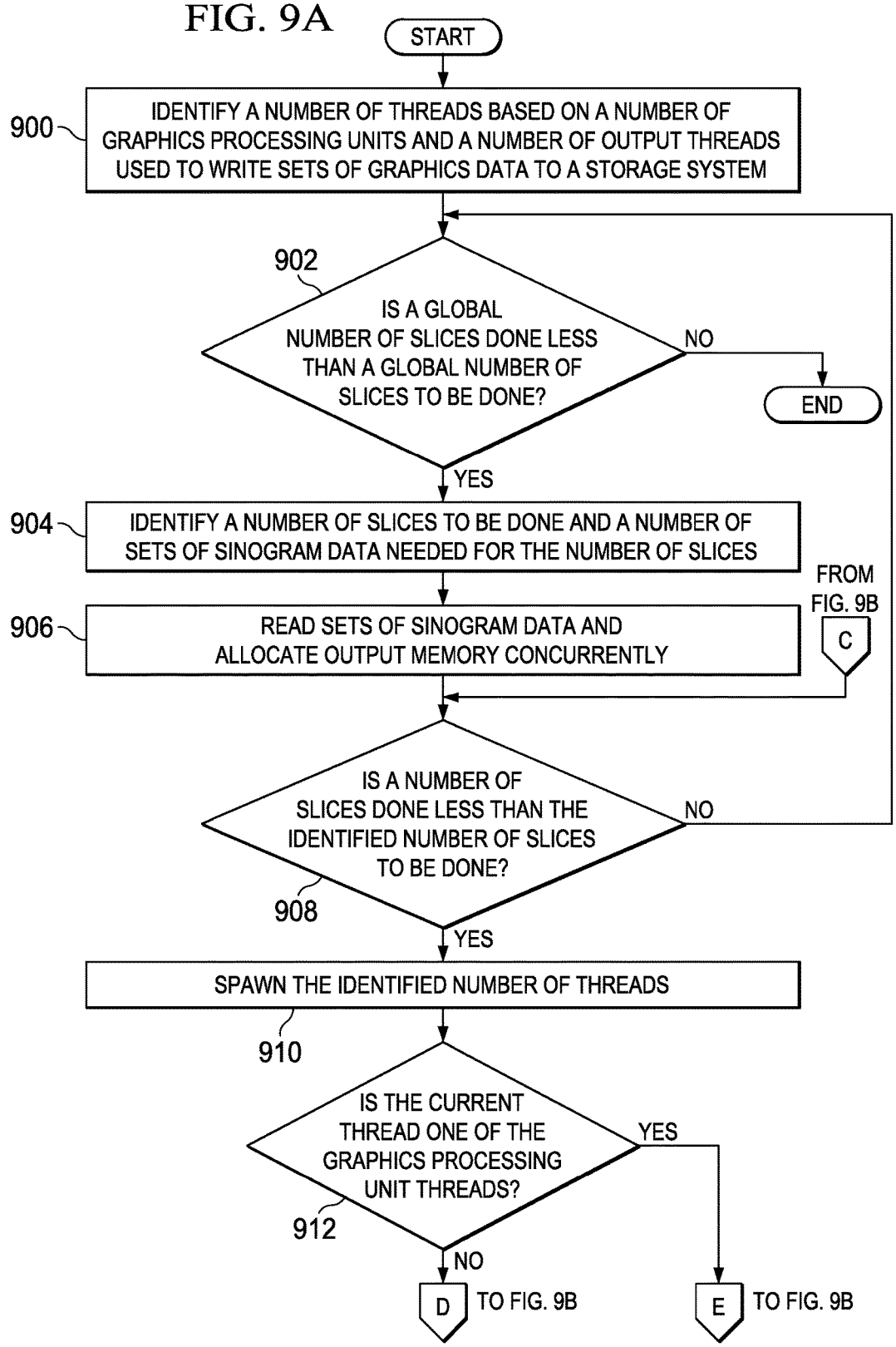

1000

| | |
|---|---|
| Algorithm 1 Dynamic System Memory Allocation Algorithm | |
| 1: | procedure DynamicSystemMemoryAlloc |
| 2: | INPUT: MiscMem, currentIndex, lastVolumeIndex, szSlice, szSino |
| 3: | OUTPUT: sysSlices, sinos |
| 4: | sysFree = floor(GetSystemMemory() * 0.9)  1002 |
| 5: | sysSlices = floor(sysFree/szSlice) |
| 6: | sinos = reconGeometry(index, index + sysSlices − 1) |
| 7: | while (sysSlices * szSlice+sinos * szSino+miscMem) ≥ sysFree do |
| 8: |    if numSysSlices != 0 then |
| 9: |       sysSlices = sysSlices − 1 |
| 10: |       sinos = reconGeometry(index, index + sysSlices − 1) |
| 11: |    else |
| 12: |       Error, reconstruction task too large for system! |
| 13: |       sinosNeeded = 0 |
| 14: |       Exit routine |
| 15: |    end if |
| 16: |    end while |
| 17: | end procedure |

Algorithm 2 Dynamic GPU Memory Allocation Algorithm procedure GpuCustomFit
2:   INPUT: Geometry, index, lastIndex, gpuProperties, szSlice, totalAngles, retry
     OUTPUT: sliceDepth,minSino,maxSino, blocks, imagesPerBlock
4:   if index > lastIndex then
         sliceDepth = 0
6:       imagesPerBlock = 0
         minSino = someHugeNumber
8:       maxSino = 0
         Exit Routine (error)
10:  end if
     totalCases = lastIndex − index + 1
12:  sliceDepth = floor(gpuProperties.freeMemory/szSlice)
     if sliceDepth > TotalCases then
14:      sliceDepth = TotalCases
     end if
16:  (minSino,maxSino) = reconGeometry(Geometry, index, index + sliceDepth − 1)
     totalSinos = maxSino − minSino + 1
18:  szImage = Geometry.columns* totalSinos * sizeof(float)
     szImage+ = gpuTexturePadding
20:  imagesPerBlock = max(1, floor((gpuProperties.freeMemory − sliceDepth * szSlice)/szImage))
     imagesPerBlock = min(imagesPerBlock, totalAngles
22:  imagesPerBlock = min(gpuProperties.maxImagesSupported, imagesPerBlock)
     blocks = ceiling(totalAngles/imagesPerBlock)
24:  success = 0
     while success == 0 and sliceDepth > 0 do
26:      usedMem = szImage * imagesPerBlock + szSlice * sliceDepth
         if usedMem > gpuProperties.freeMemory or (sliceDepth > 1 and (geometry.ratio * blocks) > sliceDepth) then
28:          if imagesPerBlock > 1 then
                 imagesPerBlock − −
30:              blocks = ceiling(totalAngles/imagesPerBlock)
             else if sliceDepth > 1 or imagesPerBlock ≤ 1 then
32:              sliceDepth − −
                 if sliceDepth == 1 and retry > 0 then
34:                  retry − −
                     Geometry.ratio − −

FROM FIG. 11A

```
36:        Update sliceDepth as above
         end if
38:      Update minSino,maxSino, totalSinos, szImage, imagesPerBlock, blocks
       end if
40:   else
         success = 1
42:   end if
      if imagesPerBlock*sliceDepth ==0 then
44:      sliceDepth = 0
         Error, exit
46:   end if
    end while
48: end procedure
```

```
Algorithm 3 Global Reconstruction Approach

1:   procedure FeldkampMultiGPU
2:   INPUT: worldTotalSlices
3:    numThreads = numGPUs + numWriteThreads
4:   worldSliceDone = 0
5:   while worldSliceDone ≤ worldTotalSlices do * loop O
6:         determine totalSlices from algorithm 1
7:         slicesDone = 0
8:         read sinograms/allocate output memory (concurrently)
9:         while sliceDone < totalSlices do * loop I
10:           spawn numThreads threads
11:           if GPU thread then
12:              execute algorithm 2
13:              run Feldkamp reconstruction on GPUs (iterative w.r.t blocks),
14:              Store slices in system memory, set TRUE flags
15:           else
16:              wait two seconds
17:              Scan bool array for TRUE flags
18:              write slices from CPU memory to disk for any TRUE flags
19:           end if
20:         end while
21:         worldSliceDone += slicesDone (atomic operation)
22:   end while
23:   end procedure
```

FIG. 12

GRAPHICS PROCESSING UNIT MANAGEMENT SYSTEM FOR COMPUTED TOMOGRAPHY

RELATED PROVISIONAL APPLICATION

This application claims the benefit of U.S. Provisional Patent Application Ser. No. 61/860,731, filed Jul. 31, 2013, and entitled "Modularized Approach to GPU-Based Computed Tomography."

STATEMENT OF GOVERNMENT RIGHTS

This invention was made with Government support under Government Contract No. DE-AC04-94AL85000 awarded by the United States Department of Energy to Sandia Corporation. The Government has certain rights in the invention, including a paid-up license and the right, in limited circumstances, to require the owner of any patent issuing in this invention to license others on reasonable terms.

BACKGROUND INFORMATION

1. Field

The present disclosure relates to computed tomography and in particular to graphics processing units in computed tomography systems. Still more particularly, the present disclosure relates generally to a method and apparatus for managing graphics processing units to reconstruct slices from sets of sinogram data.

2. Background

Computer tomography involves processing sets of data, such as that generated by x-ray scanners, to produce graphics data in the form of images. The data takes the form of sinogram data, and the images represent slices of areas in an object. Consecutive slices may be generated for a volume in the object. The slices may be put together to form a three-dimensional image of an object.

Processing sets of sinogram data is processor intensive. Graphics processing units (GPUs) are used to process sets of sinogram data to generate slices. The size of a set of sinogram data reconstructed to form a slice can vary widely in size and the number of projections. Further, with new advancements in high resolution cameras, a set of sinogram data may reach 100 megapixels. With the increase in size in the sets of data in the number of projections, increased amounts of processing power is needed.

Adding additional graphics processing units, however, may not provide the desired speed in processing sets of sinogram data. Currently used processes for processing sinogram data may not provide the desired speed in processing the sinogram data even with the use of additional graphics processing units.

Therefore, it would be desirable to have a method and apparatus that take into account at least some of the issues discussed above, as well as other possible issues. For example, it would be desirable to have a method and apparatus that increase the speed at which sets of sinogram data can be processed to generate slices.

SUMMARY

In one illustrative embodiment, a method for managing operation of graphics processing units in a computer system is presented. A processing thread in the computer system controls processing of a set of sinogram data by a graphics processing unit to form a set of graphics data. An output thread in the computer system controls writing of the set of graphics data to a storage system. The graphics processing unit is available to perform processing of another set of sinogram data while the set of graphics data is written to the storage system such that the increased availability of a plurality of graphics processing units is present.

In another illustrative embodiment, a computer system comprises a bus system, a processing unit connected to the bus system, a memory connected to the bus system, and a reconstruction controller that spawns a processing thread in the computer system that controls processing of a set of sinogram data by a graphics processing unit to form a set of graphics data. The reconstruction controller also spawns an output thread in the computer system that controls writing of the set of graphics data to a storage system. The graphics processing unit is available to perform processing of another set of sinogram data while the set of graphics data is written to the storage system such that increased availability of the plurality of graphics processing units is present.

In yet another illustrative embodiment, a computer program product comprises a computer readable storage medium, a first program code, and a second program code. The first program code controls, by a processing thread in a computer system, processing of a set of sinogram data by a graphics processing unit to form a set of graphics data. The second program code controls, by an output thread in the computer system, writing of the set of graphics data to a storage system. The graphics processing unit is available to perform processing of another set of sinogram data while the set of graphics data is written to the storage system such that increased availability of the plurality of graphics processing units is present. The first program code and the second program code are stored in the computer readable storage medium. The first program code and the second program code increase availability of the graphics processing units in a computer system, running the program when run on the computer system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 7A and 7B are illustrations of a flowchart of a process for identifying allocation of memory for a graphics processing unit in accordance with an illustrative embodiment;

FIGS. 9A and 9B are illustrations of a flowchart of a process for reconstructing a volume of an object in accordance with an illustrative embodiment;

FIG. 10 is an illustration of pseudocode for a process that identifies memory allocations in accordance with an illustrative embodiment;

FIGS. 11A and 11B are illustrations of pseudocode for a dynamic memory allocation process for memory used by graphics processing units in accordance with an illustrative embodiment;

FIG. 12 is an illustration of a pseudocode for reconstructing slices from sinogram data in accordance with an illustrative embodiment.

DETAILED DESCRIPTION

The illustrative embodiments recognize and take into account one or more considerations. For example, the illustrative embodiments recognize and take into account that currently used processes for reconstructing images from sinogram data have performance bottlenecks that occur as the size of sets of sinogram data increase. For example, the bottlenecks may be present in disk input and output, memory availability, and transfer times for storing slices after processing sinogram data to reconstruct the slices.

The illustrative embodiments also recognize and take into account that typically, one central processing unit thread is assigned to control a graphics processing unit, writing output from the graphics processing unit to a storage system when the processing of input data has been completed. Illustrative embodiments recognize and take into account that this single thread approach results in the graphics processing unit being idle when the output data, such as a slice, is written to a storage system. The illustrative embodiments recognize and take into account that this idle time is wasted and may be used to complete another task.

The illustrative embodiments also recognize and take into account that currently used reconstruction processes for generating slices from sinogram data attempt to minimize the required memory footprint. The illustrative embodiments recognize and take into account that this approach is often a hindrance to performance in reconstructing slices because pauses in generating slices from processing sets of sinogram data occur with reading and writing data to a storage system. These pauses are undesirable bottlenecks when using graphics processing units.

In one or more illustrative embodiments, a process manages operation of graphics processing units in a computer system. For example, a processing thread in the computer system controls processing of a set of sinogram data by a graphics processing unit to form a set of graphics data. An output thread in the computer system controls the writing of the set of graphics data to a storage system. The graphics processing unit is available to perform processing of another set of sinogram data while the set of graphics data is written to the storage system such that increased availability of the graphics processing unit is present.

Figure 1:
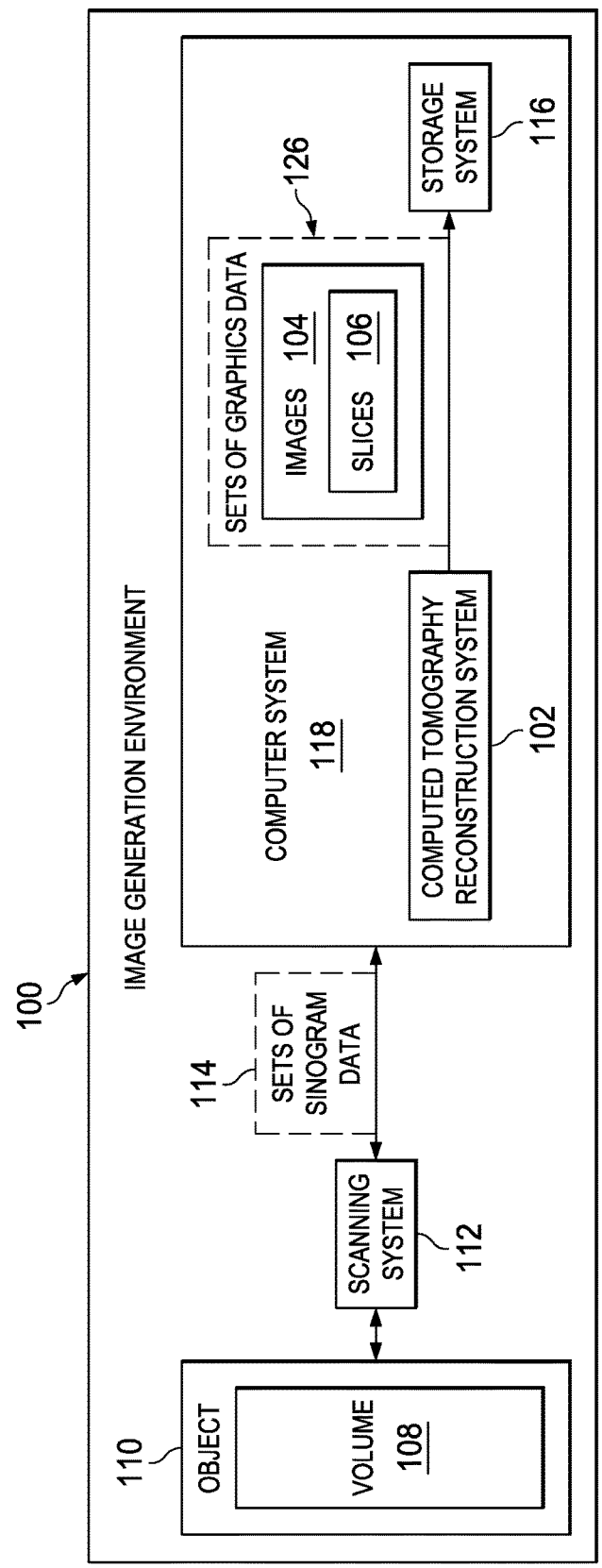
FIG. 1 is an illustration of a block diagram of an image generation environment in accordance with an illustrative embodiment.

With reference now to the figures and with reference to FIG. 1, an illustration of a block diagram of an image generation environment is depicted in accordance with an illustrative embodiment. In this illustrative example, image generation environment 100 includes computed tomography reconstruction system 102 that generates sets of graphics data 126. In the illustrative example, sets of graphics data 126 is in the form of images 104 for object 110. As depicted, images 104 are slices 106 that represent cross sections of volume 108 in object 110.

Object 110 may be an inanimate object or a living organism. Volume 108 may be a portion of or all of object 110.

In this illustrative example, computed tomography reconstruction system 102 may be implemented in computer system 118. Computer system 118 may include one or more computers. When more than one computer is present in computer system 118, those computers may communicate with each other through a communications media such as a network.

As depicted, scanning system 112 scans object 110 and generates sets of sinogram data 114. In this illustrative example, scanning of an object is performed with at least one of an x-ray scanner, a positron emission tomography (PET) scanner, a single photon emission computer tomography scanner (SPECT) scanner, or some other suitable device.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Computed tomography reconstruction system 102 receives sets of sinogram data 114 from scanning system 112 and reconstructs slices 106 from sets of sinogram data 114.

In this illustrative example, the reconstruction of slices 106 from sets of sinogram data 114 is performed using a Radon transformation. This transformation creates an image from projection data in sets of sinogram data 114 associated with a cross-sectional scan of object 110 by scanning system 112.

Computed tomography reconstruction system 102 saves slices 106 in storage system 116 in computer system 118. Storage system 116 may include at least one of a hard disk drive, a solid state drive (SSD), a tape drive, an optical disc, a disk array, or some other suitable storage device or system.

In the illustrative example, computed tomography reconstruction system 102 reconstructs images 104 more efficiently as compared to currently available systems. As depicted, computed tomography reconstruction system 102 may process increased amounts of data in sets of sinogram data 114 without undesired increases in the amount of time needed to process sets of sinogram data 114.

Figure 2:
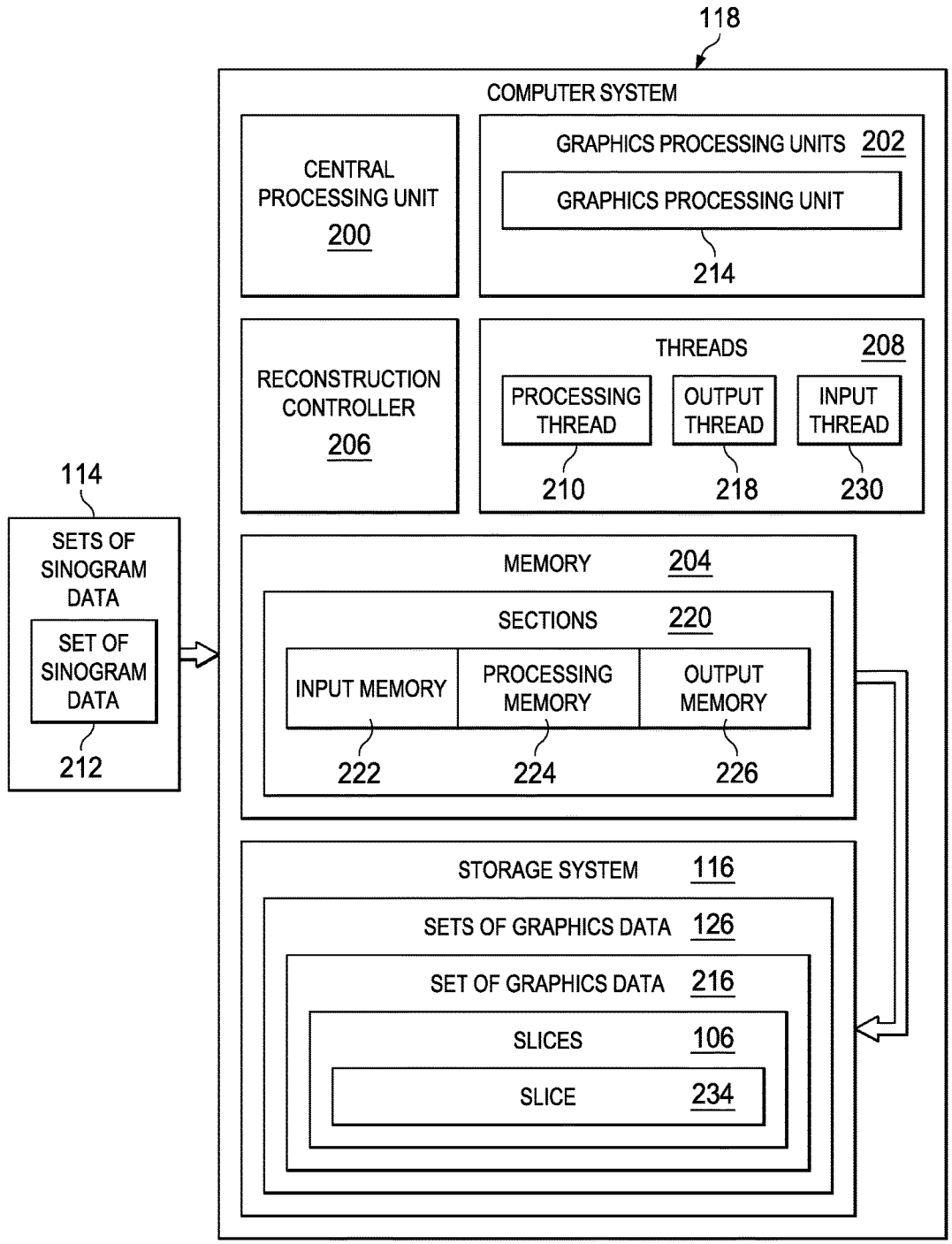
FIG. 2 is an illustration of a block diagram of a computer system used to implement a computed tomography reconstruction system in accordance with an illustrative embodiment.

Turning next to FIG. 2, an illustration of a block diagram of a computer system used to implement a computed tomography reconstruction system is depicted in accordance with an illustrative embodiment. As depicted, computed tomography reconstruction system 102 from FIG. 1 may be implemented in computer system 118. In this example, computer system 118 includes central processing unit 200, graphics processing units 202, and memory 204.

As depicted, reconstruction controller 206 controls the processing of sets of sinogram data 114 to generate sets of graphics data 126 in the form of images 104 for slices 106 in volume 108 of object 110 in FIG. 1. For example, reconstruction controller 206 may manage the operation of graphics processing units 202 in a manner that increases the availability of graphics processing units 202 in reconstructing slices 106 from sets of sinogram data 114.

In this illustrative example, reconstruction controller 206 spawns threads 208. Threads 208 include threads for reading data, writing data, and processing data. As depicted, a thread is a sequence of instructions. For example, a thread may be the smallest sequence of instructions that can be managed by a scheduler.

In the illustrative example, reconstruction controller 206 uses threads 208 to control the processing of sets of sinogram data 114 to form sets of graphics data 126 in the form of slices 106. This processing is performed in a manner that increases the speed at which sets of sinogram data 114 can be processed, reducing bottlenecks and other undesirable situations.

For example, reconstruction controller 206 may allow for processing of sets of sinogram data 114 by graphics processing units 202, queuing sets of sinogram data 114 for processing, queuing slices 106 for writing, writing slices 106 to storage system 116, and other processes to occur substantially simultaneously.

As depicted, processing thread 210 in threads 208 controls processing of set of sinogram data 212 in sets of sinogram data 114 by graphics processing unit 214 in graphics processing units 202 to form set of graphics data 216 in sets of graphics data 126. As depicted, output thread 218 in threads 208 controls writing of set of graphics data 216 to storage system 116.

With two separate threads, processing thread 210 and output thread 218, graphics processing unit 214 is available to perform processing of another set of sinogram data in sets of sinogram data 114 while set of graphics data 216 is written to storage system 116. In other words, processing of sinogram data may occur concurrently with the writing of graphics data to storage system 116. As a result, an increased availability of graphics processing unit 214 is present. In this depicted example, graphics processing unit 214 does not sit idle while set of graphics data 216 is written to storage system 116.

In this illustrative example, set of graphics data 216 is processed to obtain slice 234 in slices 106. In other words, each set of sinogram data may be used to reconstruct a slice in slices 106.

As depicted, reconstruction controller 206 also performs memory allocation for processing sets of sinogram data 114 to reconstruct slices 106. This memory allocation results in a more efficient use of memory 204 to perform reconstruction of slices 106.

For example, reconstruction controller 206 allocates sections 220 of memory 204 for processing sets of sinogram data 114. In this example, memory 204 includes system memory. Additionally, memory 204 also may include graphics processing unit memory that is for use by graphics processing units 202.

As depicted, sections 220 of memory 204 includes input memory 222 for receiving sets of sinogram data 114 as input for processing by graphics processing units 202, processing memory 224 for processing sets of sinogram data 114 by graphics processing units 202 to form slices 106, and output memory 226 for writing slices 106 to storage system 116. As depicted, input memory 222 and output memory 226 in memory 204 is system memory, and processing memory 224 is graphics processing memory for use by graphics processing units 202.

The allocation of sections 220 of memory 204 is dynamic in the illustrative examples. For example, the size of at least one of input memory 222, processing memory 224, or output memory 226 may change while processing sets of sinogram data 114. In this particular example, sets of sinogram data 114 represent all of the sinogram data to generate slices 106.

In the illustrative example, a portion of sets of sinogram data 114 may be processed each time. For example the processing of sets of sinogram data 114 may be performed in portions. Each portion of sets of sinogram data 114 may have different numbers of sinogram data sets and the size of the data in sinogram data sets may be different. The number of sets of sinogram data 114 may vary based on use of memory 204 and the size of each set of sinogram data. As used herein, "a number of," when used with reference to items, means one or more items. For example, the number of sets of sinogram data 114 is one or more sets of sinogram data 114.

For example, the size of different sets of sinogram data in sets of sinogram data 114 may vary. Variations in the size may be caused by different projections for a particular slice. As a result, the size of at least one of input memory 222, processing memory 224, or output memory 226 may change while processing different portions of sets of sinogram data 114.

Further, in this illustrative example, memory 204 is allocated to an operating system in computer system 118. In one illustrative example, about 10 percent of memory 204 is allocated to the operating system, while about 90 percent of memory 204 is allocated to sections 220.

In the illustrative example, allocation of memory 204 and other operations performed to reconstruct slices 106 may be performed concurrently. For example, input thread 230 allocates input memory 222 and output thread 218 allocates output memory 226. The allocation of output memory 226 may occur at substantially the same time as sets of sinogram data 114 are read into input memory 222. For example, input thread 230 may read sets of sinogram data 114 to input memory 222, while output thread 218 allocates output memory 226.

This type of concurrent operation may be performed when the allocation of output memory 226 takes more time than desired and may delay processing of sets of sinogram data 114 read into input memory 222. In this manner, the time needed to allocate output memory 226 and reading sets of sinogram data 114 into input memory 222 may be reduced through performing these steps at substantially the same time.

As depicted, reconstruction controller 206 may be implemented in software, hardware, firmware or a combination thereof. When software is used, the operations performed by reconstruction controller 206 may be implemented in program code configured to run on hardware, such as a processor unit. When firmware is used, the operations performed by reconstruction controller 206 may be implemented in program code and data and stored in persistent memory to run on a processor unit. When hardware is employed, the hardware may include circuits that operate to perform the operations in reconstruction controller 206.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

For example, a high-performance multi-graphics processing unit (GPU) modularized approach to reconstruction of slices in the computed tomography reconstruction system can be used such that computations, memory transfers, and disk I/O occur in parallel while accommodating the irregular nature of the steps performed in the computed tomography reconstruction system. As an example, the invention can be implemented using a dynamic multiple instruction, multiple data (MIMD)-type of architecture in a hybrid environment of Compute Unified Device Architecture (CUDA) and Open-MP.

Multiple instruction, multiple data (MIMD) is a technique employed to achieve parallelism. Data processing systems using MIMD have a number of processors that function asynchronously and independently. At any time, different processors may be executing different instructions on different pieces of data. Compute Unified Device Architecture (CUDA) is a parallel computing platform and programming model implemented by some graphics processing units. OpenMP is an application programming interface (API) that supports multi-platform shared memory multiprocessing programming on various processor architectures and operating systems. OpenMP supports multithreading as a method of parallelizing tasks. In multithreading, a master thread forks a specified number of slave threads to divide up a task among them. The forked threads then run concurrently. In these illustrative examples, the forked threads are allocated to different central processing units and graphics processing units.

Figure 3:
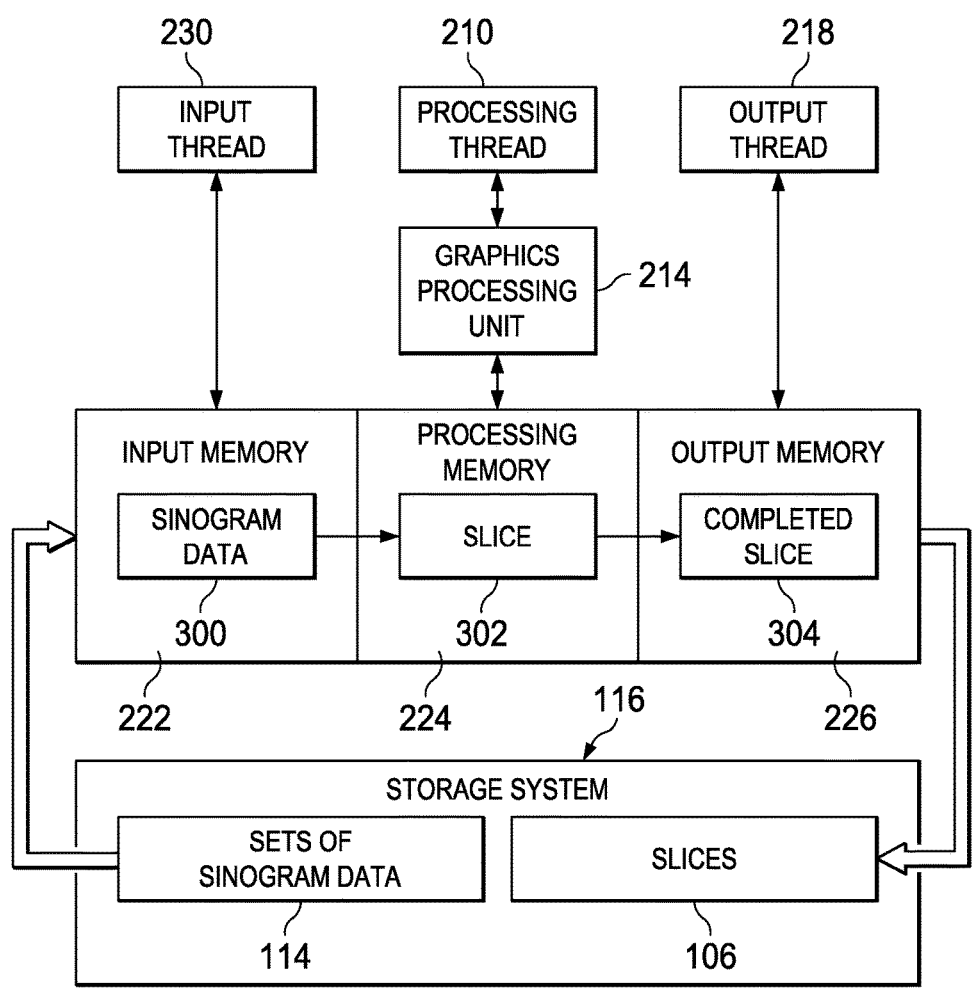
FIG. 3 is an illustration of data flow in reconstructing slices from sets of sinograms in accordance with an illustrative embodiment.

Turning next to FIG. 3, an illustration of data flow in reconstructing slices from sets of sinograms is depicted in accordance with an illustrative embodiment. In this illustrative example, input thread 230 reads a number of sets of sinogram data 114 located in storage system 116 into input memory 222 to form sinogram data 300. Sinogram data 300 may have one or more of sets of sinogram data 114. In other words, one or more of slices 106 may be reconstructed from sinogram data 300.

As depicted, processing thread 210 moves sinogram data 300 into processing memory 224. In this illustrative example, processing thread 210 may read sinogram data 300 in input memory 222 into processing memory 224 and begin processing sinogram data 300 before all of a number of sets of sinogram data 114 have been read into input memory 222 from storage system 116.

Processing thread 210 then controls graphics processing unit 214 to reconstruct slice 302 from sinogram data 300. When slice 302 is reconstructed, processing thread 210 causes graphics processing unit 214 to move slice 302 into output memory 226 as completed slice 304. Graphics processing unit 214 is available to process additional amounts of sinogram data 300 located in input memory 222 without waiting for completed slice 304 to be written to storage system 116.

Output thread 218 scans output memory 226 for completed slice 304. When completed slice 304 is found in output memory 226, output thread 218 writes completed slice 304 into storage system 116.

The illustration of the data flow in FIG. 3 has been shown with respect to reconstructing a slice by a single graphics processing unit. The data flow may be applied to processing number of sets of sinogram data 300 by all of graphics processing units 202. Each of graphics processing units 202 is assigned a processing thread. Also in other examples, additional input threads and additional output threads may be used. Further, with graphics processing units 202, each graphics processing unit is assigned a number of slices to reconstruct.

As a result, two or more of reading of sinogram data, processing of sinogram data, and writing of sinogram data may occur at substantially the same time. Thus, the illustrative embodiments provide a method and apparatus for increasing the availability of graphics processing units for processing sets of sinogram data. The illustrative embodiments overcome these technical issues by employing at least one of modularizing operations, optimizing disk operations, memory allocations, central processing unit based multithreading, or graphics processing unit processing.

One or more of these features may be used to adaptively partition data and output data in a manner that increases performance in a data processing system using graphics processing units. For example, reduced processing times, increased energy efficiency, desired resource utilization, and other benefits may occur. Further, reconstruction controller 206 reduces pauses in processing caused by a single thread controlling both the processing of sets of sinogram data 114 and the writing of slices 106 to storage system 116.

The illustration of the different components image generation environment 100 in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, computer system 118 may be distributed to more than one location. In other illustrative examples, one or more central processing units in addition to central processing unit 200 may be used. As another example, when more than one computer is present in computer system 118, reconstruction controller 206 may be distributed across two or more of the computers in computer system 118. In this example, distributed processing may occur in which central processor units, graphics processing units, memory, storage systems, and other resources may be used in those computers for reconstructing slices 106.

Figure 4:
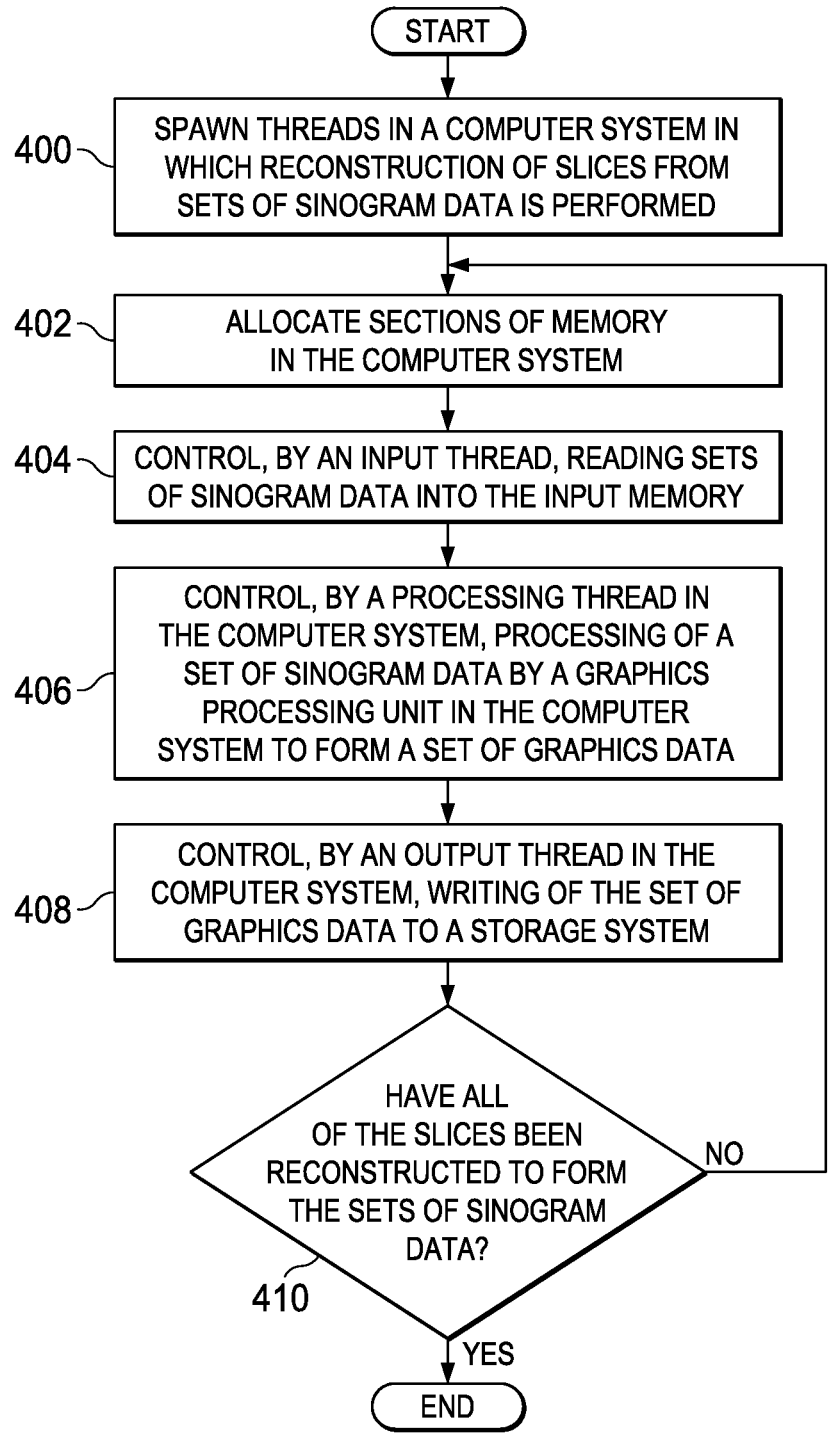
FIG. 4 is an illustration of a flowchart of a process for managing operation of graphics processing units in a computer system in accordance with an illustrative embodiment.

With reference next to FIG. 4, an illustration of a flowchart of a process for managing operation of graphics processing units in a computer system is depicted in accordance with an illustrative embodiment. The process illustrated in FIG. 4 may be implemented in image generation environment 100 in the different components in image generation environment 100 in FIGS. 1 and 2. In particular, the process may be implemented in reconstruction controller 206 in FIG. 2.

The process begins by spawning threads in a computer system in which reconstruction of slices from sets of sinogram data is performed (step 400). These threads perform the different steps to reconstruct slices. For example, the threads include threads that control reading of sets of sinogram data into memory, control processing of sets of sinogram data by the graphics processing units to generate the sets of graphics data; processing the sets of sinogram data to reconstruct slices; and writing of sets of graphics data to a storage system.

The process then allocates sections of memory in the computer system (step 402). The sections of memory allocated include, for example, input memory for inputting sets of sinogram data for processing by the plurality of graphics processing units, processing memory for processing the sets of sinogram data by the graphics processing units to form slices, and output memory for writing the slices to the storage system.

The process controls, by an input thread, reading sets of sinogram data into the input memory (step 404). In step 404, some or all of the sets of sinogram data are read into the input memory. The number of sets of sinogram data read into the input memory depends on the size of the sets of sinogram data and the amount of memory available.

The process controls, by a processing thread in the computer system, processing of a set of sinogram data by a graphics processing unit in the computer system to form a set of graphics data (step 406). The process then controls, by an output thread in the computer system, writing of the set of graphics data to a storage system (step 408). As depicted, the set of graphics data is an image for a slice in a volume of an object. In this example, the graphics processing unit is available to perform processing of another set of sinogram data while the set of graphics data is written to the storage system such that increased availability of the graphics processing unit is present.

Next, a determination is made as to whether all of the slices have been reconstructed from the sets of sinogram data (step 410). If one or more additional sets of sinogram data are present for processing, the process returns to step 402. In this case, step 402 is performed again to provide a dynamic allocation of memory. Otherwise, the process terminates.

The allocation of the memory may be based in part on changes in the size of sets of the sinogram data processed by the graphics processing units. For example, a number of the slices of data to be generated from the sets of sinogram data is identified. The input memory and the processing memory are allocated based on the number of slices and the sets of sinogram data for the slices in this example.

In the flowchart in FIG. 4, at least two of step 404, step 406, or step 408 may be performed at substantially the same time. For example reading in of sets of sinogram data into the input memory may occur as processing of sinogram data is performed. The graphics processing unit may begin processing a set of sinogram data before all of the set of another set of sinogram data is read into the input memory.

Figure 5:
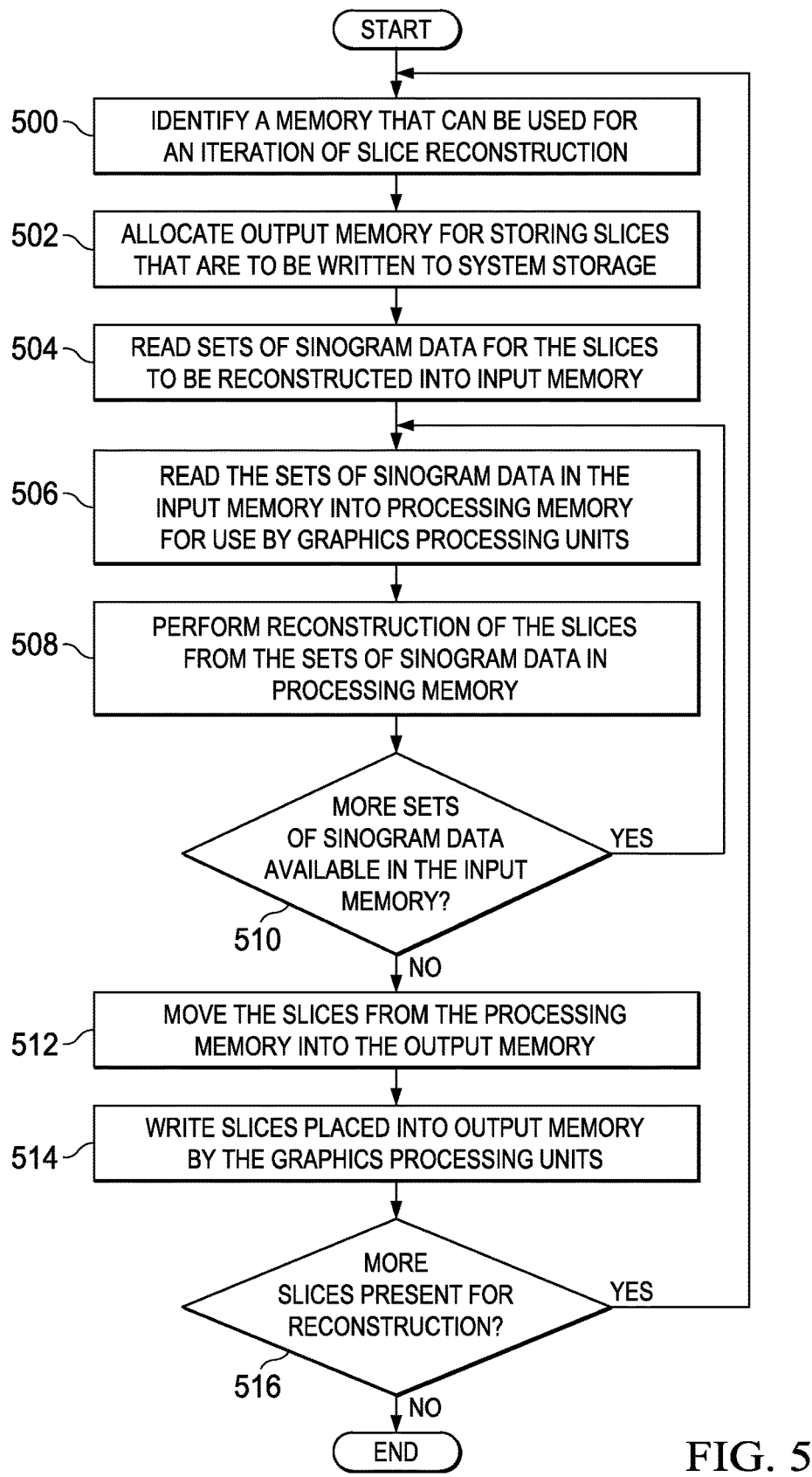
FIG. 5 is an illustration of a high level process for processing sets of sinogram data in accordance with an illustrative embodiment.

With reference next to FIG. 5, an illustration of a high level process for processing sets of sinogram data is depicted in accordance with an illustrative embodiment. The process illustrated in FIG. 4 may be implemented in computed tomography reconstruction system 102 in FIG. 1.

The process begins by identifying memory that can be used for an iteration of slice reconstruction (step 500). Each iteration of slice reconstruction processes a number of sets of sinogram data to reconstruct slices. The number of sets of sinogram data that may be processed may change between iterations based on the size of the sets of sinogram data. In step 500, the memory is system memory.

The process allocates output memory for storing slices that are to be written to system storage (step 502). In step 502, a thread is assigned the task of allocating memory to store output data, such as slices. This thread also writes slices to system storage.

The process reads sets of sinogram data for the slices to be reconstructed into input memory (step 504). The input memory is allocated to hold all of the sets of sinogram data in this particular example. In this illustrative example, step 504 is performed at the same time as step 502. In another example, a set of sinogram data is read into input memory while a slice is written to the storage system from output memory.

In this illustrative example, step 502 and step 504 are performed using threads that are concurrent threads. In one illustrative example, the number of threads 208 is based on the number of concurrent threads that central processing unit 200 can support. For example, a quad core processor may support for active concurrent threads and a quad core processor with hyperthreading can support 8 active concurrent threads. Each of threads 208 is given a specific designation and tasks in the illustrative examples.

The process then reads the sets of sinogram data in the input memory into processing memory for use by graphics processing units (step 506). Depending on how much processing memory is available, only a portion of the sets of sinogram data may be read into the processing memory. The process then performs reconstruction of the slices from the sets of sinogram data in processing memory (step 508). The process then determines whether more sets of sinogram data are available in the input memory (step 510). If more sets of sinogram data are available in the input memory, the process goes back to step 506. If additional sets of sinogram data are not available in the input memory, the process then moves the slices from the processing memory into the output memory (step 512). The process writes slices placed into output memory by the graphics processing units (step 514).

Next, the process then determines if more slices are present for reconstruction (step 516). If more slices are present for reconstruction, the process returns to step 500 as described above. Otherwise, the process terminates.

Figure 6:
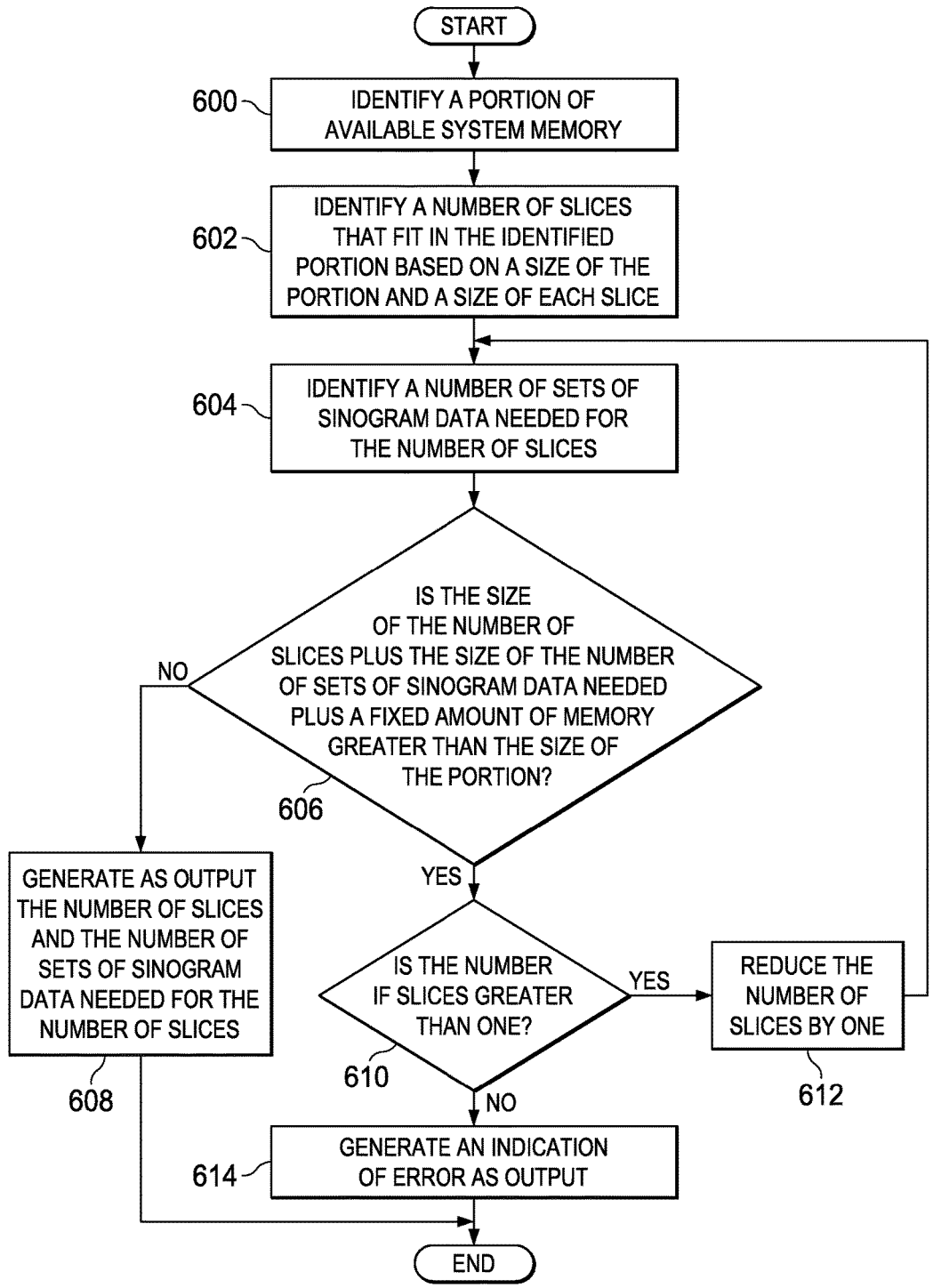
FIG. 6 is an illustration of a flowchart of a process for identifying allocation of memory in accordance with an illustrative embodiment.

Turning next to FIG. 6, an illustration of a flowchart of a process for identifying allocation of memory is depicted in accordance with an illustrative embodiment. The process illustrated in FIG. 6 is an example of an implementation of step 500 in FIG. 5. In this example, the memory allocated may be memory 204 in FIG. 2.

The process begins by identifying a portion of available system memory (step 600). The system memory is memory that is accessible by a central processing unit and graphics processing units in this example. For example, memory 204 may be system memory.

The process next identifies a number of slices that fit in the identified portion based on a size of the portion and a size of each slice (step 602). The process identifies a number of sets of sinogram data needed for the number of slices (step 604). The process next determines whether the size of the number of slices plus the size of the number of sets of sinogram data needed plus a fixed amount of memory is greater than the size of the portion (step 606).

As depicted, if the size of the number of slices plus the size of the number of sets of sinogram data needed plus a fixed amount of memory is not greater than the size of the portion, the process then generates as output the number of slices and the number of sets of sinogram data needed for the number of slices (step 608), with the process terminating thereafter. If the size of the number of slices plus the size of the number of sets of sinogram data needed plus a fixed amount of memory is greater than the size of the portion, the process determines whether the number of slices is greater than one (step 610).

If the number of slices is not greater than one, the process generates an indication of error as output (step 614), with the process terminating thereafter. Otherwise, the process reduces the number of slices by one (step 612), with the process retuning to step 604.

Figure 7B:
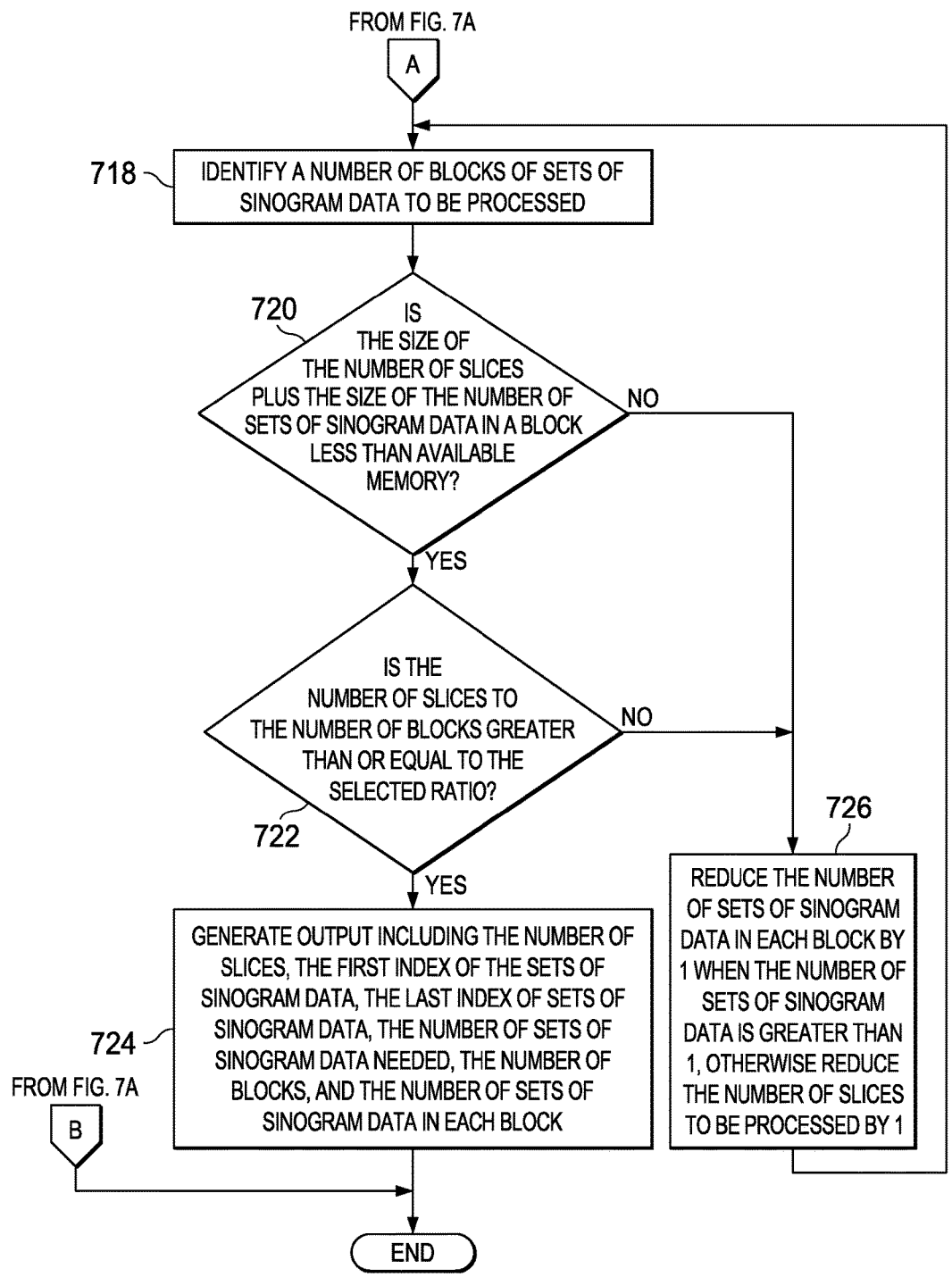

Turning next to FIGS. 7A and 7B, an illustration of a flowchart of a process for identifying allocation of memory for a graphics processing unit is depicted in accordance with an illustrative embodiment. The process illustrated in FIG. 6 may be used to allocate memory 204 for use by graphics processing units 202.

The process begins with receiving input (step 700). In this example, the input includes a first index of slices ready to be reconstructed, last index of slices ready to be reconstructed, size of a reconstructed slice, a ratio of a number of slices to a number of blocks of sets of sinogram data to read, and a number of retries allowed for reducing the number of slices in the ratio.

The process determines whether the first index is greater than the last index (step 702). If the first index is greater than the last index, the process generates an indication of error as output (step 704), with the process terminating thereafter. However, if the first index is not greater than the last index, the process next identifies a number of slices available to be reconstructed based on the first index of slices and the last index of slices (step 706).

The process identifies the maximum number of slices that can be reconstructed with the graphics processing unit (step 708). In step 708, the maximum number of slices is identified based on available memory for the graphics processing unit and the size of a reconstructed slice.

Next, the process identifies the number of slices for the graphics processing unit to process (step 710). The number of slices to process in step 710 is identified from the lesser of total number of slices available to be reconstructed and the maximum number of slices that can be reconstructed with the graphics processing unit. The process also identifies a first index of sets of sinogram data, a last index of the sets of sinogram data, and a number of sets of sinogram data needed by the graphics processing unit to reconstruct the identified number of slices (step 712).

The process identifies the size of the sets of sinogram data needed by the graphics processing unit to reconstruct the identified number of slices (step 714). Then, the process identifies a number of sets of sinogram data in each block of sets of sinogram data to be processed (step 716). In step 716, the number of sets of sinogram data identified are based on the greater of the number 1 and the number sets of sinogram data that can fit in the available memory not needed for the number of slices to be processed.

The process next identifies a number of blocks of sets of sinogram data to be processed (step 718). The number of blocks are identified in step 718 based on the identified number of sets of sinogram data for each block. The process then determines whether the size of the number of slices plus the size of the number of sets of sinogram data in a block is less than available memory (step 720).

If the size of the number of slices plus the size of the number of sets of sinogram data in a block is less than available memory, the process next determines whether the number of slices to the number of blocks is greater than or equal to the selected ratio (step 722). In this illustrative example, the selected ratio is the ratio of the number of slices for reconstruction to the number of blocks.

If the number of slices to the number of blocks is greater than or equal to the selected ratio, the process then generates output including the number of slices, the first index of the sets of sinogram data, the last index of sets of sinogram data, the number of sets of sinogram data needed, the number of blocks, and the number of sets of sinogram data in each block (step 724), with the process terminating thereafter.

With reference again to steps 720 and 722, if the size of the number of slices plus the size of the number of sets of sinogram data in a block is now less than available memory or the number of slices to the number of blocks is not greater than or equal to the selected ratio, the process then reduces the number of sets of sinogram data in each block by 1 when the number of sets of sinogram data is greater than 1, otherwise the process reduces the number of slices to be processed by 1 (step 726) with the process returning to step 718.

Figure 8:
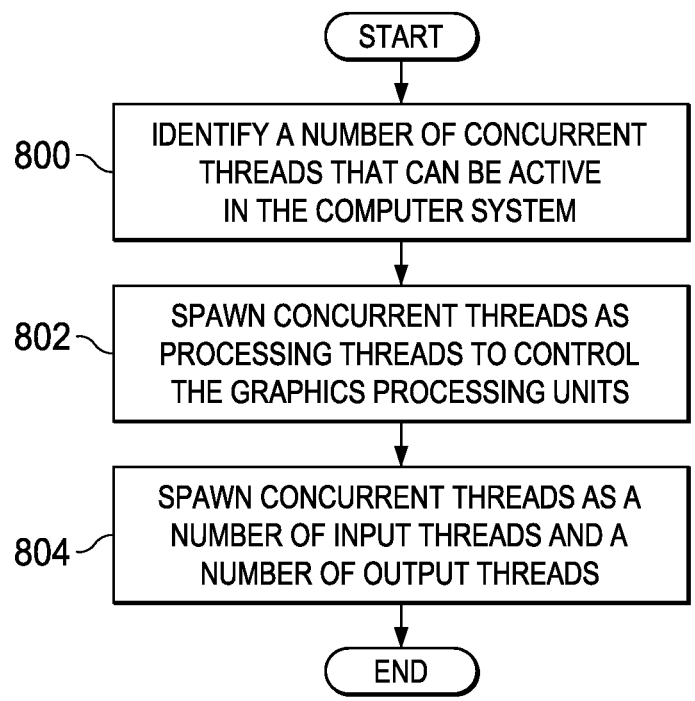
FIG. 8 is an illustration of a flowchart of a process for spawning threads in accordance with an illustrative embodiment.

With reference now to FIG. 8, an illustration of a flowchart of a process for spawning threads is depicted in accordance with an illustrative embodiment. The process in FIG. 8 may be implemented in reconstruction controller 206 in FIG. 2 to spawn threads to control the reconstruction of slices.

The process begins by identifying a number of concurrent threads that can be active in the computer system (step 800). The number of concurrent threads that can be active are used to spawn concurrent threads as input threads, processing threads, and output threads.

The process spawns concurrent threads as processing threads to control the graphics processing units (step 802). In step 802, a processing thread is assigned to each graphics processing unit. As a result, the number of processing threads is equal to the graphics processing units.

The process then spawns concurrent threads as a number of input threads and a number of output threads (step 804), with process terminating thereafter. The number of input threads and the number of output threads is based on the remaining number of concurrent threads that are available after spawning the processing threads.

Figure 9B:
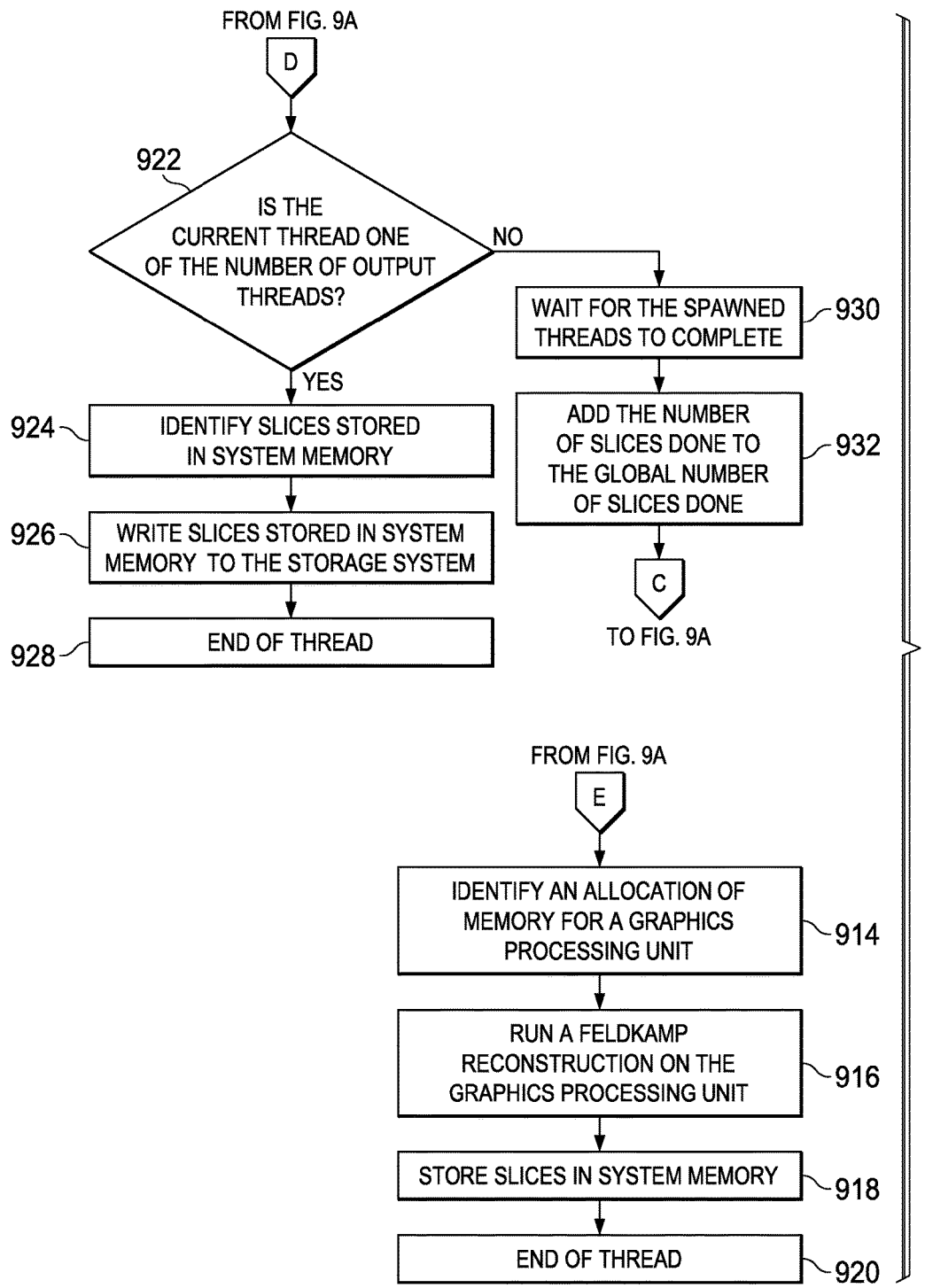

With reference now to FIGS. 9A and 9B, an illustration of a flowchart of a process for reconstructing a volume of an object is depicted in accordance with an illustrative embodiment. The process in FIGS. 9A and 9B may be implemented in reconstruction controller 206 in FIG. 2 to reconstruct slices for a volume scanned by a scanning system.

The process begins by identifying a number of threads based on a number of graphics processing units and a number of output threads used to write sets of graphics data to a storage system (step 900). The process determines whether a global number of slices done is less than a global number of slices to be done (step 902). If the global number of slices done is not less than a global number of slices to be done, the process terminates. Otherwise, the process identifies a number of slices to be done and a number of sets of sinogram data needed for the number of slices (step 904).

The process then reads sets of sinogram data and allocates output memory concurrently (step 906). For example, the process may use a first set of threads to allocate the output memory and populate the output memory with zeroes. In this depicted example, the process may also use a second set of threads to read the sets of sinogram data concurrently while the first set of threads are allocating the output memory and populating the output memory with zeroes.

Then, the process determines whether a number of slices done is less than the identified number of slices to be done (step 908). If the number of slices done is not less than the identified number of slices to be done, the process returns to step 902. Otherwise, the process next spawns the identified number of threads (step 910.)

The process then determines if the current thread is one of the graphics processing unit threads (step 912). In step 912, processing thread 210 in FIG. 2 is an example of a graphics processing unit thread. If the current thread is one of the graphics processing unit threads, the process identifies an allocation of memory for a graphics processing unit (step 914). In this example, step 914 may be performed using steps 700-726 in FIGS. 7A and 7B. The process next runs a Feldkamp reconstruction on the graphics processing unit (step 916). In this example, a Feldkamp reconstruction is an image reconstruction of the slice that may be formed from cone-beam projections collected along a single circular source trajectory. The process then stores slices in system memory (step 918). In this example, system memory may need memory 204. As depicted, the current one of the graphics processing unit threads spawned in step 910 ends in step 920.

With reference again to step 912, if the current thread is not one of the graphics processing unit threads, the process proceeds to step 922. If the current thread is not one of the graphics processing unit threads the process next determines whether the current thread is one of the number of output threads (step 922). If the current thread is one of the number of output threads, the process identifies slices stored in system memory (step 924). The process then writes slices stored in system memory to the storage system (step 926). As depicted, the current one of the output threads spawned in step 910 ends in step 928.

With reference again to step 922, if the current thread is not one of the output threads, the process waits for the spawned threads to complete (step 930). The process then adds the number of slices done to the global number of slices done (step 932), with the process returning to step 908.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In another example, step 500 and step 502 may be performed in reverse order in some illustrative examples. In other illustrative examples, these steps may be performed at about the same time. Also, the flowcharts do not show all of the steps that may be used in processing sets of sinogram data. For example, the process illustrated in FIG. 5 also includes allocating input memory and processing memory even though they are not shown.

With reference now to FIG. 10, an illustration of pseudo-code for a process that identifies memory allocations is depicted in accordance with an illustrative embodiment. Pseudocode 1000 illustrates an example of one manner in which memory allocations may be identified for use in processing sinogram data to form slices.

In this illustrative example, the input into the process is MiscMem, currentIndex, lastVolumeIndex, szSlice is the size of the slize, szSino is the size of the sinogram data, and the output is sysSlices and sinos.

As depicted, MiscMem is the amount of miscellaneous memory space needed for the reconstruction, currentIndex is an indices pointing to the slice that needs to be reconstructed, and lastVolumeIndex is the last volume processed. In this example, szSlice is the size of the slice, and szSino is the size of all of the sets of sinogram data needed to reconstruct the slices. As depicted, sysSlices is the number of slices that can be stored, and sinos is the index range for the number of slices to be reconstructed.

In this example, GetSystemMemory identifies the system memory that is present, and sysFree is a portion of the memory not allocated in the operating system. As depicted, numSysSlices is the number of slices stored in system memory, index is the slice index, and sinosNeeded is a constant.

As shown, reconGeometry(index, index+sysSlices−1) gives the number of sets of sinogram data needed for the given slice index range. The slice index range is the number of slices that will be reconstructed.

Pseudocode 1000 uses the maximum amount of system memory present for use by the central processing unit without requiring input from the user. In this illustrative example, from the free memory in the computer system, about 10 percent of the memory is reserved for the operating system while the rest of the memory is assumed to be available for the reconstruction task. This memory is used for receiving sets of sinogram data as input data, processing the sets of sinogram data, and storing slices for writing to a storage system once the slices are reconstructed from the sets of sinogram data. Additionally, this memory may also store data for queuing and variables.

The amount of data in the sets of sinogram data needed to reconstruct process a given set of consecutive slices may vary with respect to the location of the slices. Pseudocode 1000 provides a dynamic identification of the amounts of sinogram and output slices to reconstruct for a given iteration of reconstruction for a selected number of slices. In other words, each iteration occurs with the reconstruction of a selected number of slices. The allocation of memory may change with each of these iterations.

In line 1002 in pseudocode 1000, reconGeometry (index, index+sysSlices−1) gives the number of sinograms needed for the given slice index range. As depicted, miscMem is the amount of miscellaneous memory space needed for the reconstruction. In this example, miscMem is assumed to be substantially fixed.

This process in pseudocode 1000 is repeated if the amount of data for the volume of slices is too large to be processed at one time. In other words, multiple iterations may be performed to obtain all of the slices from all of the sets of sinogram data present for processing.

Once the slices identified by pseudocode 1000 are reconstructed and transferred to a storage system disk, pseudocode 1000 repeats the process of memory allocation with the remaining volume for which slices are to be reconstructed from sinogram data. In this illustrative example, the computer system has sufficient amounts of memory to hold the sets of sinogram data needed for each graphics processing unit to run once and to hold the slices.

Turning next to FIGS. 11A and 11B, an illustration of pseudocode for a dynamic memory allocation process for memory used by graphics processing units is depicted in accordance with an illustrative embodiment. Pseudocode 1100 is an example of one manner in which memory may be allocated to graphics processing units.

In this illustrative example, the input to pseudocode 1100 is Geometry, index, lastIndex, gpuProperties, szSlice, totalAngles, and retry. The output is sliceDepth, minSino, maxSino, blocks, and imagesPerBlock.

Geometry is the geometry of the object scanned, index is an index that points to the first slice, lastIndex is an index that points to the last slice. In this example, gpuProperties contains information about the graphics processing unit, szSlice is the size of the slice, totalAngles is the number of upsets of sinogram, and retry is the number of retries that are allowed.

In the illustrative example, sliceDepth is the number of slices to be reconstructed, minSino is an index that points to the first set of sinogram data, and maxSino is an index that points to the last set of sinogram data. As depicted, blocks is the number of subsets of sets of sinograms that are to be read. In this example, blocks identifies the number of times that the graphics processing unit pulls in more sets of sinograms to reconstruct slices. In this example, imagesPerBlock is the number of sets of sinograms in a block.

As depicted, szImage is the size of the set of sinogram data. In this illustrative example, totalCases is the number of slices to be processed, totalSinos is the total number of sets of sinogram data to be processed, usedMem is the size of the number of slices plus the size of the number of sets of sinogram data to be processed.

In pseudocode 1100, the graphics processing unit reads set of sinograms from the input memory, calculating the reconstructed slices, and storing the slices in the processing memory allocated to the graphics processing unit.

During reconstruction, the graphics processing unit reads in a block of sinograms. A block of sinograms may include one or more sets of sinograms that correspond to one or more images for slices. The graphics processing unit processes the block, and then reads in another block until all the slices are reconstructed. Once the reconstruction is finished, the graphics processing unit outputs the slices to the output memory.

A ratio of the number of slices to reconstruct to the number of blocks to read is selected. This ratio is the ratio of sliceDepth/blocks in pseudocode 1100. The process in pseudocode 1100 tries to fit the maximum number of slices on the graphics processing unit possible such that the ratio of the number of slices to reconstruct to the number of blocks to read is as close as possible to the ideal ratio.

In pseudocode 1100, the process first calculates the maximum number of slices that can fit in the processing memory and then calculates the maximum of 1 and number of images that can fit in the remaining free memory. In this example, the total memory is total slices plus total images. If the total memory required is less than the free memory and the ratio obtained is greater than the ideal ratio, the process terminates.

If the ratio is greater than the ideal ratio, then the sliceDepth is kept constant and the number of blocks is increased. The increase in the number of blocks means fewer sets of sinogram data are read into the processing memory for processing.

If either of the above conditions are not met, then imagesPerBlock is decreased first because maximizing the sliceDepth is a higher priority in this example. If the imagesPerBlock cannot be decreased, then the sliceDepth is decreased and the process is run again. If sliceDepth becomes 1 and retry>0, the ratio is decreased and the process is run again. The process avoids setting the sliceDepth to be 1 to avoid eliminating the benefit to parallelizing the reconstruction.

With reference now to FIG. 12, an illustration of a pseudocode for reconstructing slices from sinogram data is depicted in accordance with an illustrative embodiment. Pseudocode 1200 is an example of one manner in which the reconstruction of slices for a volume may be performed.

As depicted, the input to pseudocode 1200 is worldToTalSlices. This input identifies the total number of slices that are reconstructed for a volume. As depicted, numThreads is the number of threads that are to be spawned. In this illustrative example, numGPUs is the number of graphics processing units, and numWriteThreads is the number of write threads that are needed. worldSliceDone is a global variable storing the number of slices that have been processed by the reconstruction task, slicesDone is the number of slices that have been processed in one iteration of the reconstruction task, totalSlices is the number of slices to process in one iteration of the reconstruction task.

In pseudocode 1200, the process performs the steps for reconstructing sets of sinogram data for an entire volume.

The illustration of pseudocode in FIGS. 10-12 is presented as depicting one manner in which some processes in the illustrative examples may be implemented. The pseudocode in these figures are not meant to limit the manner in which other illustrative examples may be implemented.

Figure 13:
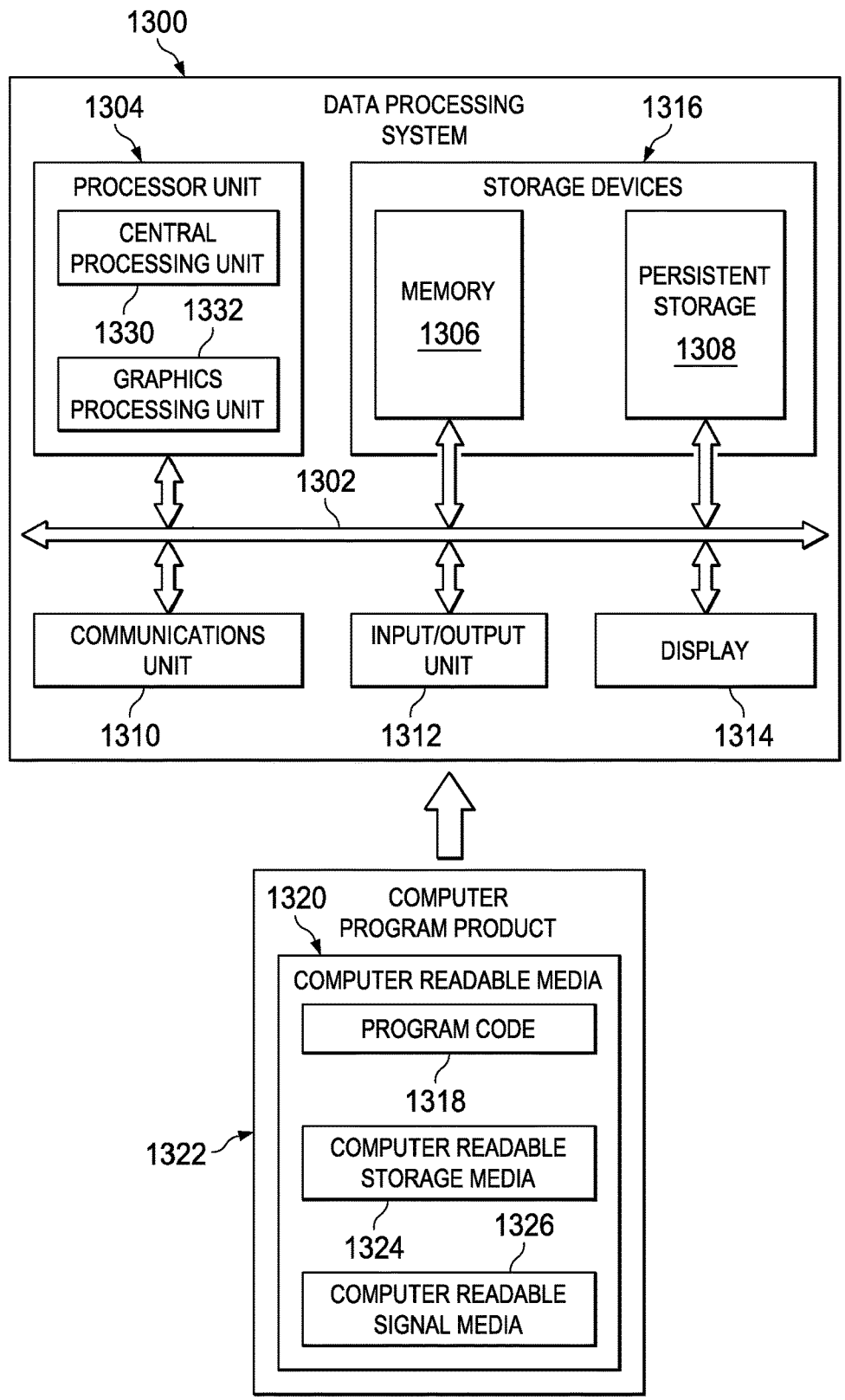
FIG. 13 is an illustration of a data processing system in the form of a block diagram in accordance with an illustrative embodiment.

Turning now to FIG. 13, an illustration of a data processing system in the form of a block diagram is depicted in accordance with an illustrative embodiment. Data processing system 1300 may be used to implement one or more computers in computer system 118 in FIG. 1.

As depicted, data processing system 1300 includes communications framework 1302, which provides communications between processor unit 1304, storage devices 1306, communications unit 1308, input/output unit 1310, and display 1312. In some cases, communications framework 1302 may be implemented as a bus system.

Processor unit 1304 is configured to execute instructions for software to perform a number of operations. Processor unit 1304 may comprise a number of processors, a multiprocessor core, or some other type of processor, depending on the implementation. In this example, processor unit 1304 includes central processing unit 1330 and graphics processing units 1332. The architecture selected for processor unit 1304 may be selected as one that is suited to for processing images. In particular, central processing unit (CPU) 1330 and graphics processing units (GPUs) 1332 may be selected for processing sets of sinogram data to reconstruct slices for a volume in an object.

In some cases, processor unit 1304 may take the form of a hardware unit, such as a circuit system, an application specific integrated circuit (ASIC), a programmable logic device, or some other suitable type of hardware unit.

Instructions for at least one of the operating system, applications, or programs run by processor unit 1304 may be located in storage devices 1306. Storage devices 1306 may be in communication with processor unit 1304 through communications framework 1302. As used herein, a storage device, also referred to as a computer readable storage device, is any piece of hardware capable of storing information on a temporary or permanent basis. This information may include, but is not limited to, data, commands, program code, or other information.

Memory 1314 and persistent storage 1316 are examples of storage devices 1306. Memory 1314 may take the form of, for example, a random access memory or some type of volatile or non-volatile storage device. Persistent storage 1316 may comprise any number of components or devices. For example, persistent storage 1316 may comprise a hard drive, a flash memory, a rewritable optical disk, a rewritable magnetic tape, or some combination of the above. The media used by persistent storage 1316 may or may not be removable.

Communications unit 1308 allows data processing system 1300 to communicate with other data processing systems, devices, or some combination thereof. Communications unit 1308 may provide communications using physical communications links, wireless communications links, or some combination thereof.

Input/output unit 1310 allows input to be received from and output to be sent to other devices connected to data processing system 1300. For example, input/output unit 1310 may allow user input to be received through at least one of a keyboard, a mouse, and or some other type of input device. As another example, input/output unit 1310 may allow output to be sent to a printer connected to data processing system 1300. In this illustrative example, input may be received from scanning system 112 in FIG. 1. The input may take the form of sets of sinogram data.

Display 1312 is configured to display information to a user. Display 1312 may comprise, for example, without limitation, a monitor, a touch screen, a laser display, a holographic display, a virtual display device, or some other type of display device.

In this illustrative example, the processes of the different illustrative embodiments may be performed by processor unit 1304 using computer implemented instructions. These instructions may be referred to as program code, computer usable program code, or computer readable program code and may be read and executed by one or more processors in processor unit 1304.

In these examples, program code 1318 is located in a functional form on computer readable media 1320, which is selectively removable, and may be loaded onto or transferred to data processing system 1300 for execution by processor unit 1304. Program code 1318 and computer readable media 1320 together form computer program product 1322. In this illustrative example, computer readable media 1320 may be computer readable storage media 1324 or computer readable signal media 1326.

Computer readable storage media 1324 is a physical or tangible storage device used to store program code 1318 rather than a medium that propagates or transmits program code 1318. Computer readable storage media 1324 may be, for example, without limitation, an optical or magnetic disk or a persistent storage device that is connected to data processing system 1300.

Alternatively, program code 1318 may be transferred to data processing system 1300 using computer readable signal media 1326. Computer readable signal media 1326 may be, for example, a propagated data signal containing program code 1318. This data signal may be using at least one of an electromagnetic signal, an optical signal, or some other type of signal that can be transmitted over physical communications links, wireless communications links, or both.

The illustration of data processing system 1300 in FIG. 13 is not meant to provide architectural limitations to the manner in which the illustrative embodiments may be implemented. The different illustrative embodiments may be implemented in a data processing system that includes components in addition to or in place of those illustrated for data processing system 1300. Further, components shown in FIG. 13 may be varied from the illustrative examples shown. For example, although multiple central processing units are shown in processor unit 1304, other illustrative examples may include only a single graphics processing unit.

In the illustrative example, data processing system 1300 may be a computer that supports system memory greater than 100 GB a random access memory with one or more central processing units that are multicore central processing units. The multicore processing units may have 8 or more cores. Additionally, for more graphics processing units may be present. Further, persistent storage 1316 may be a storage array that supports multiple terabytes. The storage arrays may be implemented using RAID or RAID like systems.

Thus, one or more illustrative embodiments may provide a method and apparatus for increasing the speed at which input data, such sets of sinogram data, can be processed to generate and store output data, such as slices. In one illustrative example, various processes for generating and storing slices may be performed at substantially the same time rather than sequentially as in currently used systems that employ graphics processing units.

For example, idle time for graphics processing units that is present when a slice is written to a storage system is reduced or eliminated. With an illustrative example, a graphics processing unit is available to process another set of sinogram data after a current set of sinogram data. When a process to reconstruct a slice from a set of sinogram data is complete, the slice is written to storage by a different thread from the one that controls the processing of the set of sinogram data.

As another example, the application of memory for processing sets of sinogram data are performed dynamically. As result, changes in the size of sets of sinogram data for different slices may be taken into account during processing sinogram data rather than using the same memory allocation for processing all of the sets of sinogram data.

The description of the different illustrative embodiments has been presented for purposes of illustration and description, and is not intended to be exhaustive or limited to the embodiments in the form disclosed. Many modifications and variations will be apparent to those of ordinary skill in the art. For example, image data processed by the illustrative embodiments may include data from ultrasound scans, magnetic resonance imaging (MRI), single-photon emission computed tomography (SPECT), positron emission tomography (PET), holography, or any other type of data that has a large computation, disk, and data input/output tasks. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing operation of graphics processing units in a computer system, the method comprising:
    allocating input memory, processing memory, and output memory in memory of the computer system, wherein allocating the input memory, processing memory, and output memory of the computer system comprises:
    for a first set of sinogram data, identifying a number of first slices that are to be generated from the first set of sinogram data when the first set of sinogram data is processed by a graphics processing unit (GPU), wherein the input memory and the processing memory are allocated based on the number of first slices;
    subsequent to allocating the input memory, the processing memory, and the output memory, by way of an input thread of the computer system, writing the first set of sinogram data to the input memory;
    by way of a processing thread of the computer system, writing the first set of sinogram data to the processing memory;
    by way of the processing thread of the computer system, causing the GPU to process the first set of sinogram data in the processing memory to form the first slices, the first slices data being written to the output memory;
    by way of an output thread of the computing system that is separate and distinct from the processing thread, writing the first slices from the output memory to a storage system; and
    by way of the processing thread and while the output thread is writing the slices to the storage system, causing the GPU to process a second set of sinogram data to form second slices.

2. The method of claim 1, further comprising:
    spawning a plurality of processing threads that control processing of a plurality of sets of sinogram data by a plurality of GPUs to generate a plurality of sets of slices, the plurality of processing threads comprising the processing thread, the plurality of sets of sinogram data comprising the first set of sinogram data and the second set of sinogram data; and
    spawning a plurality of output threads that control the writing of the sets of graphics data to the storage system, the plurality of output threads comprising the output thread.

3. The method of claim 2 further comprising:
    changing the allocation of the sections of memory based on changes in sizes of sets of the sinogram data processed by the GPUs.

4. The method of claim 1 further comprising:
    reading the sets second set of sinogram data into the input memory while a slice from the first slices is being written to the storage system from the output memory.

5. The method of claim 1 further comprising:
    identifying a number of concurrent threads that can be active in the computer system; and
    assigning a portion of the number of concurrent threads identified to slices in the output memory to the storage system.

6. The method of claim 1 further comprising:
    scanning an object with a scanning system selected from at least one of an x-ray scanner, a positron emission tomography (PET) scanner, or a single photon emission computer tomography scanner (SPECT) scanner.

7. A computer system comprising:
    a bus system;
    a processing unit connected to the bus system, wherein the processing unit comprises a central processing unit and a plurality of graphics processing units (GPUs);
    a memory connected to the bus system; and
    a reconstruction controller that allocates sections of the memory, the sections of memory including input memory, processing memory, and output memory, wherein the reconstruction controller identifies a number of first slices to be generated when one or more GPUs process a first set of sinogram data, wherein the reconstruction controller allocates the sections of the input memory and the processing memory based upon the first number of slices, the reconstruction controller further spawns an input thread in the computer system, the input thread writes the first set of sinogram data to the input memory, the reconstruction controller further spawns a processing thread in the computer system, the processing thread controls processing of the first set of sinogram data by a GPU in the plurality of GPUs to form the first slices, the first slices being written to the output memory; and the reconstruction controller further spawns an output thread in the computer system that controls writing of the first set of graphics dataslices from the output memory to a storage system, the output thread separate from the processing thread, wherein the GPU is available to perform processing of a second set of sinogram data while the first slices are written to the storage system, wherein the processing thread controls processing of the second set of sinogram data by the GPU to form while the output thread is controlling writing of the first slices to the storage system.

8. The computer system of claim 7, wherein the reconstruction controller changes the allocation of the memory based on changes in sizes of sets of sinogram data processed by the plurality of GPUs.

9. The computer system of claim 7, wherein the input thread writes the second set of sinogram data into the input memory while the first slices are written to the storage system from the output memory by the output thread.

10. The computer system of claim 7, wherein the reconstruction controller identifies a number of concurrent threads that can be active in the computer system and assigns a portion of the number of concurrent threads identified to write slices in the output memory to the storage system.

11. The computer system of claim 7 further comprising:
    a scanning system that scans an object with a scanning system selected from at least one of an x-ray scanner, a positron emission tomography (PET) scanner, or a single photon emission computer tomography scanner (SPECT) scanner.

12. The computer system of claim 7, wherein the reconstruction controller is implemented in at least one of hardware or program code.

13. A computer readable storage medium comprising instructions that, when executed by a computer system cause the computer system to perform the following acts:
    allocating input memory, processing memory, and output memory in memory of the computer system, wherein allocating the input memory, processing memory, and output memory of the computer system comprises:

for a first set of sinogram data, identifying a number of first slices that are to be generated from the first set of sinogram data when the first set of sinogram data is processed by a graphics processing unit (GPU), wherein the input memory and the processing memory are allocated based on the number of first slices;

writing, by way of an input thread in the computer system, the first set of sinogram data to the input memory;

writing, by way of a processing thread in the computer system, the first set of sinogram data to the processing memory;

controlling, by way of the processing thread, processing of the first set of sinogram data by the GPU to form the first slices, wherein the processing thread writes the first slices to the output memory;

controlling, by an output thread in the computer system, writing of the first slices data to a storage system, the output thread separate and distinct from the processing thread, wherein the GPU is available to perform processing of a second set of sinogram data while the first slices are written to the storage system; and controlling, by the processing thread, processing of the second set of sinogram data by the GPU to form second slices while the output thread is controlling writing of the first slices to the storage system.

* * * * *